United States Patent
Shrestha et al.

(10) Patent No.: US 10,700,578 B2
(45) Date of Patent: Jun. 30, 2020

(54) APPARATUSES, METHODS, AND SYSTEMS FOR STARTING AN EXCITERLESS SYNCHRONOUS GENERATOR

(71) Applicant: ABB Schweiz AG, Baden (CH)

(72) Inventors: Ghanshyam Shrestha, Cary, NC (US); Chenjie Lin, Fuquay Varina, NC (US); Mehanathan Pathmanathan, Västerås (SE); Pedro Rodriguez, Västerås (SE)

(73) Assignee: ABB Schweiz AG, Baden (CH)

( * ) Notice: Subject to any disclaimer, the term of this patent is extended or adjusted under 35 U.S.C. 154(b) by 233 days.

(21) Appl. No.: 15/858,043

(22) Filed: Dec. 29, 2017

(65) Prior Publication Data
US 2019/0207484 A1    Jul. 4, 2019

(51) Int. Cl.
*H02K 11/042* (2016.01)
*H02K 3/20* (2006.01)
*H02K 21/04* (2006.01)
*H02K 19/28* (2006.01)

(52) U.S. Cl.
CPC ............ *H02K 11/042* (2013.01); *H02K 3/20* (2013.01); *H02K 19/28* (2013.01); *H02K 21/042* (2013.01)

(58) Field of Classification Search
CPC ...... H02K 11/042; H02K 21/042; H02K 3/20; H02K 19/28
USPC ....................................... 310/68 D
See application file for complete search history.

(56) References Cited

U.S. PATENT DOCUMENTS

| | | | | |
|---|---|---|---|---|
| 2,999,955 A * | 9/1961 | Levy | ........................ | H02K 3/28 310/188 |
| 3,449,652 A * | 6/1969 | Ishizaki | .................... | H02P 1/46 318/718 |
| 3,892,987 A * | 7/1975 | Noodlennan | ........ | H02K 13/006 310/46 |
| 4,656,410 A | 4/1987 | Shibata | | |
| 9,813,004 B2 | 11/2017 | Shrestha et al. | | |
| 2006/0038405 A1* | 2/2006 | Xu | ......................... | H02K 19/16 290/31 |

(Continued)

FOREIGN PATENT DOCUMENTS

EP          2782226 A2 *  9/2014  ............. H02K 19/28

OTHER PUBLICATIONS

International Searching Authority/US, International Search Report & Written Opinion issued in corresponding Application No. PCT/US2018/067810, dated Apr. 8, 2019, 13 pp.

*Primary Examiner* — Alex W Mok
(74) *Attorney, Agent, or Firm* — Taft Stettinius & Hollister LLP; J. Bruce Schelkopf

(57) ABSTRACT

Unique systems, methods, techniques and apparatuses of an exciterless synchronous generator are disclosed. One exemplary embodiment is an exciterless synchronous generator comprising a stator, a rotor, and a startup excitation system. The stator includes a set of stator windings. The rotor includes an energy harvest winding, a DC power supply including a DC bus and coupled to the energy harvest winding, and a field winding coupled to the DC power supply. The startup excitation system comprises one of a magnetic field generation system structured to generate a magnetic field received by the energy harvest winding in response to a rotation of the rotor, wherein the magnetic field is converted to DC power with the DC power supply and transmitted to the field winding; or a rotor DC power source including and diode coupled in series across the DC bus.

19 Claims, 4 Drawing Sheets

(56) References Cited

U.S. PATENT DOCUMENTS

| | | | |
|---|---|---|---|
| 2007/0090713 A1* | 4/2007 | Arita | H02K 21/042 310/181 |
| 2009/0302788 A1* | 12/2009 | Mitsuda | H02P 3/18 318/376 |
| 2009/0315329 A1* | 12/2009 | Duffey | H02K 16/02 290/44 |
| 2014/0265679 A1* | 9/2014 | Bradfield | H02K 7/116 310/83 |
| 2016/0204722 A1* | 7/2016 | Sudhoff | H02K 21/042 310/156.25 |
| 2016/0211787 A1* | 7/2016 | Shrestha | H02K 19/12 |
| 2017/0063280 A1 | 3/2017 | Li et al. | |

* cited by examiner

APPARATUSES, METHODS, AND SYSTEMS FOR STARTING AN EXCITERLESS SYNCHRONOUS GENERATOR

BACKGROUND

The present disclosure relates generally to exciterless synchronous generators. In order to operate at synchronous speeds, synchronous machines require an energized field winding incorporated into the machine rotor. Many synchronous machines use an external exciter machine to energize the field winding during normal operation where synchronous machines operate at synchronous speeds. Certain synchronous machines include energy harvest windings, also known as energy harvesting coils, incorporated into the rotor to energize the field winding. The energy harvesting coils receive power in the form of intentional and unintentional harmonics output from the air gap of the synchronous machine. Existing exciterless synchronous generators suffer from a number of shortcomings and disadvantages. Exciterless synchronous generators currently do not require a separate exciter machine while operating at synchronous speeds, but exciterless synchronous generators do require a dedicated exciter current path and exciter machine to perform startup operations. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for exciterless synchronous generators. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
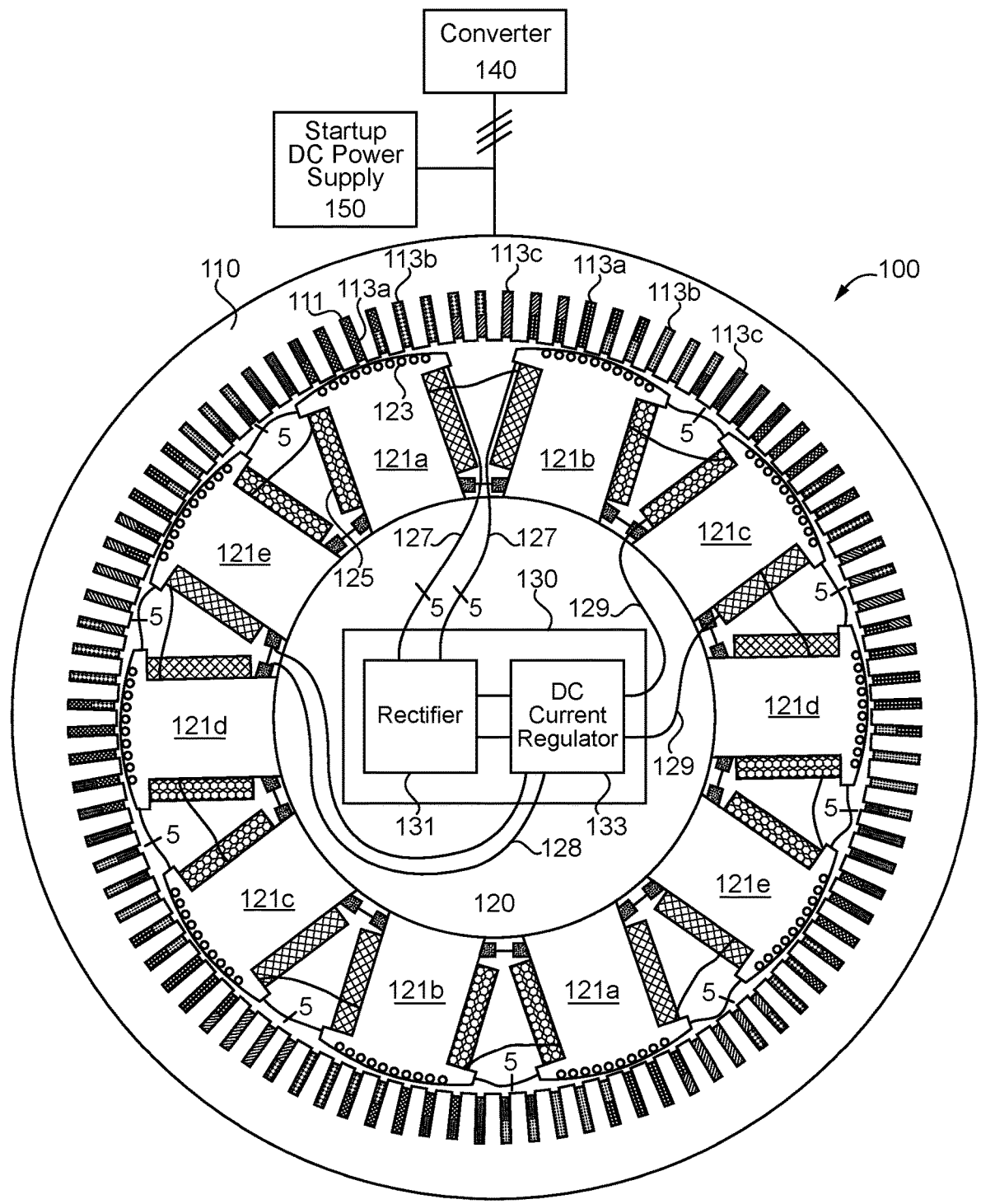
FIG. 1 illustrates an exemplary exciterless synchronous generator.

With reference to FIG. 1 there is illustrated a cross section of an exemplary synchronous generator 100 including a stator 110 and a rotor 120. It shall be appreciated that the arrangement of stator 110 and rotor 120 of generator 100 is illustrated for the purpose of explanation and is not intended as a limitation of the present disclosure. For example, rotor 120 may be implemented with any number of pole pairs greater than two pole pairs. Stator 110 may be implemented with more or fewer windings or winding slots.

Stator 110 is provided in an annular form and includes a plurality of slots such as slot 111 distributed circumferentially about stator 110 and facing inwardly toward the interior of the stator annulus. The set of stator windings 113a-c are disposed or mounted within the plurality of slots 111 in a repeating pattern. The stator windings may be arranged in a non-uniform pattern, as illustrated in FIG. 1, or in a uniform pattern. Each of the stator windings is coupled to a power converter 140 and structured to transfer alternating current (AC) power from stator 110 to power converter 140. The AC power transferred between the stator windings 113a-c and converter 140 includes harmonic distortion. In certain embodiments, the harmonic distortion is a harmonic component actively injected by converter 140. In certain embodiments, the harmonic distortion is generated by operation of generator 100. In certain embodiments, power converter 140 is a grid synchronizer.

Rotor 120 is a salient pole rotor including a set of rotor pole pairs 121a-121e, a main field winding 129, an auxiliary field winding 128, a set of multiphase energy harvest windings 127, and a direct current (DC) power supply 130. Each rotor pole pair includes two rotor poles located on opposite sides of rotor 120. In certain embodiments, rotor 120 is a non-salient structure, such as a cylindrical rotor. Unless specifically indicated to the contrary, reference to rotor structures such as poles, pole pairs, teeth, and slots shall be understood to be inclusive of both salient pole rotors and non-salient pole rotors such as cylindrical rotors. In other embodiments, rotor 120 include a single energy harvest winding instead of multiple energy harvest windings.

The set of energy harvest windings 127 are structured to extract air gap harmonic power which is used for powering main field winding 129. The use of energy harvest windings 127 eliminates the need for a separate exciter machine during operation of generator 100. In the illustrated embodiment, the set of energy harvest windings 127 includes five energy harvest windings. In other embodiments, the set of energy harvest windings may include any number of energy harvest windings, including a single phase energy harvest winding.

The set of energy harvest windings 127 is operatively coupled, such as being mounted, to each rotor pole of rotor pole pairs 121a-e. In certain embodiments, each winding of the set of energy harvest windings are mounted to less than all rotor poles of rotor pole pairs 121a-e. In the illustrated embodiment, energy harvest windings 127 are disposed in slots, such as slot 123, on an outward surface of each rotor pole facing stator 110. Energy harvest windings 127 may be mounted to rotor 120 in other ways, such as electroplating or press mounting, to name but a few example.

DC power supply 130 is structured to receive air gap harmonic power from the set of energy harvest windings 127, convert the received AC power to DC power, and output the DC power to main field winding 129. Specifically, DC power supply 130 includes a rectifier 131 coupled to the set of energy harvest windings 127, a DC current regulator 133 coupled to main field winding 129, and a DC bus coupled between rectifier 131 and DC current regulator 133. In other embodiments, DC power supply includes additional components, such as active filters, passive filters, or energy storage devices to name but a few examples. It shall be appreciated that that topologies of DC power supply 130, including topologies of rectifier 131 and DC current regulator 133 may be any topology structured to receive AC power from the energy harvest windings and provide DC power to the field winding, unless otherwise specified.

Main field winding 129 is operatively coupled to each rotor pole and coupled to DC power supply 130. Main field winding 129 is structured to generate a magnetic field using the DC power from DC power supply 130. In order for generator 100 to operate in normal operating mode, voltage across the DC bus must exceed a voltage threshold. In certain embodiments, the voltage threshold is within a range of 10-1000 volts depending on the type of generator and the loading condition of the generator.

Auxiliary field winding 128 is operatively coupled to each rotor pole and coupled to DC power supply 130. Auxiliary field winding 128 is structured to generate a magnetic field using power received from energy harvest windings 127 in startup operation mode. In certain embodiments, auxiliary field winding 128 is structured to generate a magnetic field in normal operation mode. In certain embodiments, auxiliary field winding 128 is coupled to less than all rotor poles.

Before generator 100 operates in a normal operation mode, the voltage across the field winding must be increased to a magnitude sufficient to operate generator 100 at synchronous speeds. Therefore, generator 100 undergoes a startup operation mode before entering normal operation mode. Generator 100 includes a startup DC power supply 150 coupled to the set of stator windings 113a-c. As rotor 120 is rotated by a prime mover, startup DC power supply 150 is structured to selectively provide DC power to the set of stator windings 113a-c effective to produce air gap harmonic power receivable by the set of energy harvest windings 127. The power received from startup DC power supply 150 through the set of energy harvest windings 127 is used to increase the voltage across main field winding 129 to a level sufficient for normal operation of generator 100 whereby generator 100 operates at synchronous speeds. By using the magnetic coupling between the set of stator windings 113a-c and energy harvest windings 127, generator 100 does not require a separate exciter machine for startup operation.

In other embodiments, generator 100 does not include startup DC power supply 150 and instead includes an AC power supply coupled to the set of stator windings 113a-c and structured to provide AC power from an AC power source or a DC power source coupled to a DC to AC converter to the set of stator windings effective to produce air gap harmonic power receivable by the set of energy harvest windings 127 during startup operation mode. It shall be appreciated that any or all of the foregoing features of exciterless synchronous generator 100 may also be present in the other exciterless synchronous generators disclosed herein.

Figure 2:
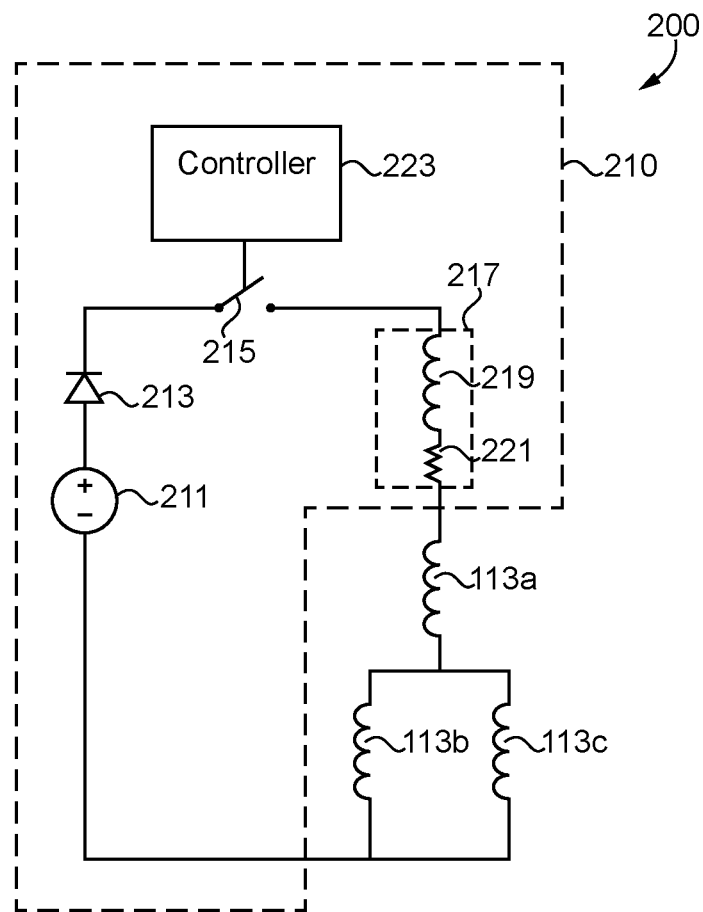
FIG. 2 is a circuit diagram illustrating the exemplary startup excitation circuit.

With reference to FIG. 2 there is illustrated an exemplary startup excitation circuit 200 including a magnetic field generation system 210 such as startup DC power supply 150 in FIG. 1. System 210 is coupled to stator windings, such as stator windings 113a-c of stator 110 in FIG. 1. System 210 includes a DC power source 211, a diode 213, a switching device 215, and a current limiting device 217 coupled in series. DC power source 211 is structured to output DC power to stator windings 113a-c. DC power source 211 may be a battery, a battery bank, a capacitor, a supercapacitor, another type of DC power source, or an AC power source coupled to an AC to DC power converter, to name but a few examples. Diode 213 is structured to allow current flowing from DC power source 211 to stator windings 113a-c and block current flowing to DC power source 211 from stator windings 113a-c. In other embodiments, diode 213 may be replaced with another type of semiconductor device structured to only allow unidirectional current such as a controlled switching device.

In the illustrated embodiment, stator windings 113a-c are coupled to system 210 such that winding 113a is coupled in series with parallel-coupled windings 113b and 113c. In other embodiments, stator windings may be arranged in other configurations, such as arranging all windings in series or in parallel, to name but a few examples.

Current limiting device 217 includes an inductive element 219, such as an inductor, and a resistive element 221, such as a resistor. For example, current limiting device 217 may have an impedance rating of 1 ohm.

Switching device 215 is structured to open and close effective to selectively allow and block current flowing from DC power source 211 to stator windings 113a-c. Switching device 215 may include a mechanical switch or a semiconductor switch. Switching device 215 is controlled by controller 223 structured to transmit an activation signal to switching device 215 effective to operate switching device 215.

When synchronous generator 100 enters a startup operation mode, DC power from DC power source 211 is output to the stator windings 113a-113c while rotor 120 is being rotated effective to produce air gap harmonics receivable by the energy harvest windings 127 of rotor 120. For example, DC power source 211 may output DC power with a voltage between 5V and 100V depending on the size of the generator. As system 210 continues to provide power to DC power supply 130 by way of energy harvest windings 127 during startup operation mode, voltage across energy harvest windings 127, the DC bus of DC power supply 130, and the main field winding 129 increases. Once voltage across main field winding 129 is sufficient to operate generate 100 at synchronous speeds, controller 223 opens switching device 215 to interrupt the flow of DC power from DC power source 211. Generator 100 then enters normal operation without the use of system 210 or an external excitation machine. In certain embodiments, generator 100 may be in startup operation mode for a time period between 50 ms and 400 ms. Once the startup operation is completed, generator 100 enters normal operation mode where the voltage of the field winding may fluctuate depending on the generator and operating conditions.

It shall be appreciated that in certain embodiments, magnetic field generation system 210 may only include DC power source 211, switching device 215, and controller 223. In other embodiments, magnetic field generation system 210 may include an additional element such as one of diode 213 or current limiting device 217.

Figure 3:
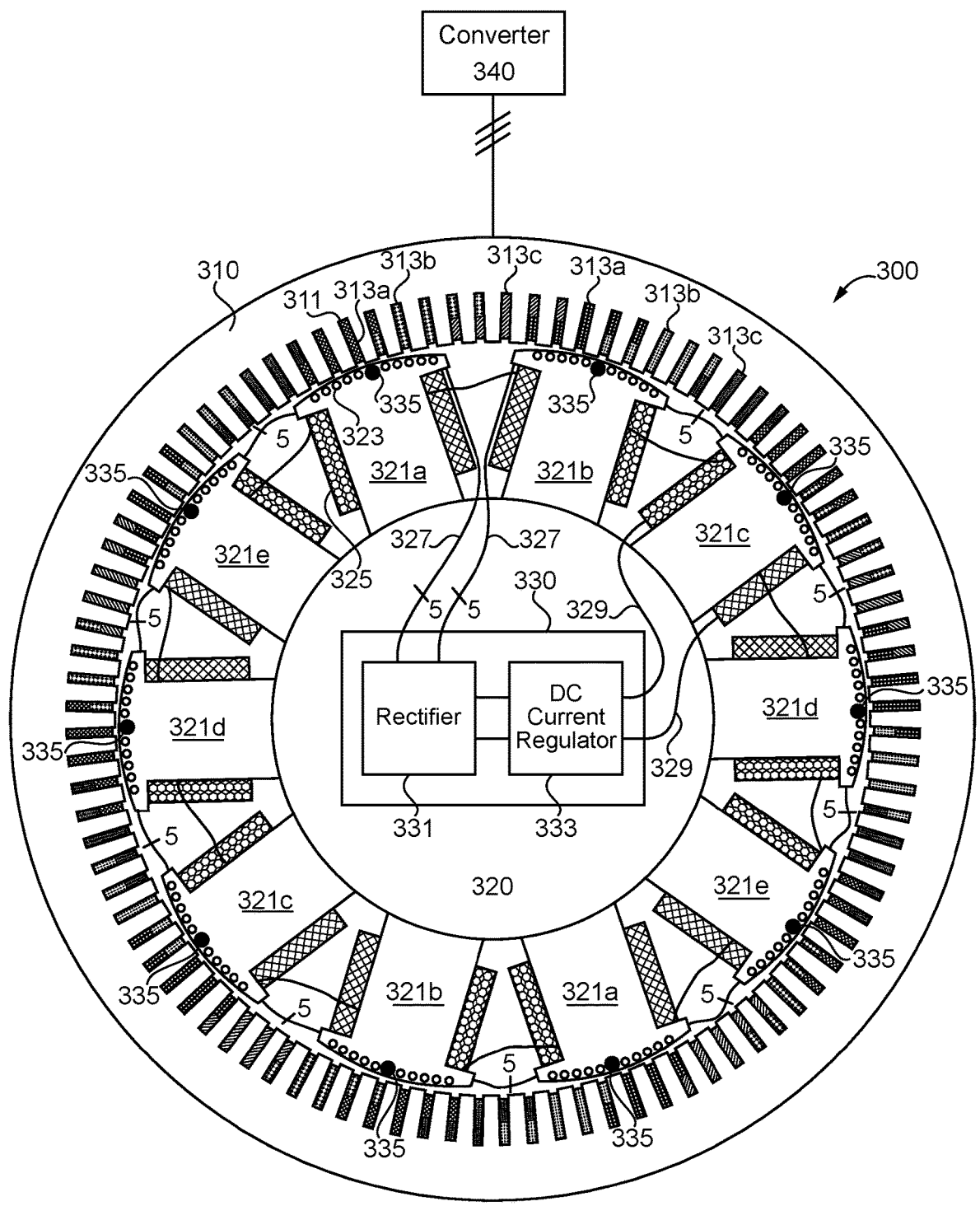
FIG. 3 illustrates another exemplary exciterless synchronous generator.

With reference to FIG. 3 there is illustrated a cross section of an exemplary synchronous generator 300 including a stator 310 and a rotor 320. Stator 310 is provided in an annular form and includes a plurality of slots such as slot 311 distributed circumferentially about the stator and facing inwardly toward the interior of the stator annulus. Stator windings such as windings 313a-c are disposed or mounted within the plurality of slots 311 in a repeating pattern. Each of the set of stator windings is coupled to a power converter 340 structured to transfer AC power between the stator windings and power converter 340. The AC power transferred between the set of stator windings 313a-c and converter 340 includes harmonic distortion. In certain embodiment the stator is connected to a grid by way of a grid synchronizer.

Rotor 320 is a salient pole rotor including one set of rotor pole pairs 321a-121e, a field winding 329, a set of multiphase energy harvest windings 327, and a direct current (DC) power supply 330. Each rotor pole pair includes two rotor poles located on opposite sides of rotor 320. In certain embodiments, rotor 320 is a non-salient structure, such as a cylindrical rotor. Unless specifically indicated to the contrary, reference to rotor structures such as poles, pole pairs, teeth, and slots shall be understood to be inclusive of both salient pole rotors and non-salient pole rotors such as cylindrical rotors.

The set of energy harvest windings 327 are structured to extract air gap harmonic power which is used for powering field winding 329. The use of energy harvest windings 327 eliminates the need for a separate exciter machine during normal operation of generator 300.

The set of energy harvest windings 327 are operatively coupled, such as being mounted, to each rotor pole of rotor pole pairs 321a-e. DC power supply 330 is structured to receive power from the set of energy harvest windings 327, convert the received AC power to DC power, and output the DC power field winding 329. Specifically, DC power supply 330 includes a rectifier 331 coupled to the set of energy harvest windings 327 and a DC current regulator 333 coupled to field winding 329. Field winding 329 is wrapped around each rotor pole and coupled to DC power supply 330. Field winding 329 is structured to generate a magnetic field using the DC power from DC power supply 330.

Generator 300 includes a magnetic field generation system including a plurality of permanent magnets 335 operatively coupled, such as being mounted, to an outer surface of each of rotor poles 221 using techniques such as insertion, injection molding, and 3D printing, to name but a few examples. As rotor 320 rotates, the magnetic field of the plurality of permanent magnets 335 passively generates air gap harmonics receivable by energy harvest windings 327. In certain embodiments, permanent magnets are mounted to less than all of the rotor poles of rotor 320. In certain embodiments, the length of at least one of the plurality of permanent magnets is less than the length of rotor 320. The volume of each magnet of the set of permanent magnets 335 is structured such that the voltage generated at the energy harvest windings is greater than the forward bias voltage of the semiconductor devices of rectifier 331. In certain embodiments, the plurality of permanent magnets is operatively coupled to stator 310 or operatively coupled to rotor 320 at a different position.

In a startup operation mode, rotor 320 rotates causing the magnetic field of the set of permanent magnets 335 to generate air gap harmonics receivable by energy harvest windings 327. As generator 300 continues to operate in startup operation mode, power the voltage across the energy harvest windings, a DC bus of the DC power supply 330, and field winding 329 increases until the voltage across field winding 329 is sufficient to enter normal operation mode so as to operate generator 300 at synchronous speeds.

Figure 4:
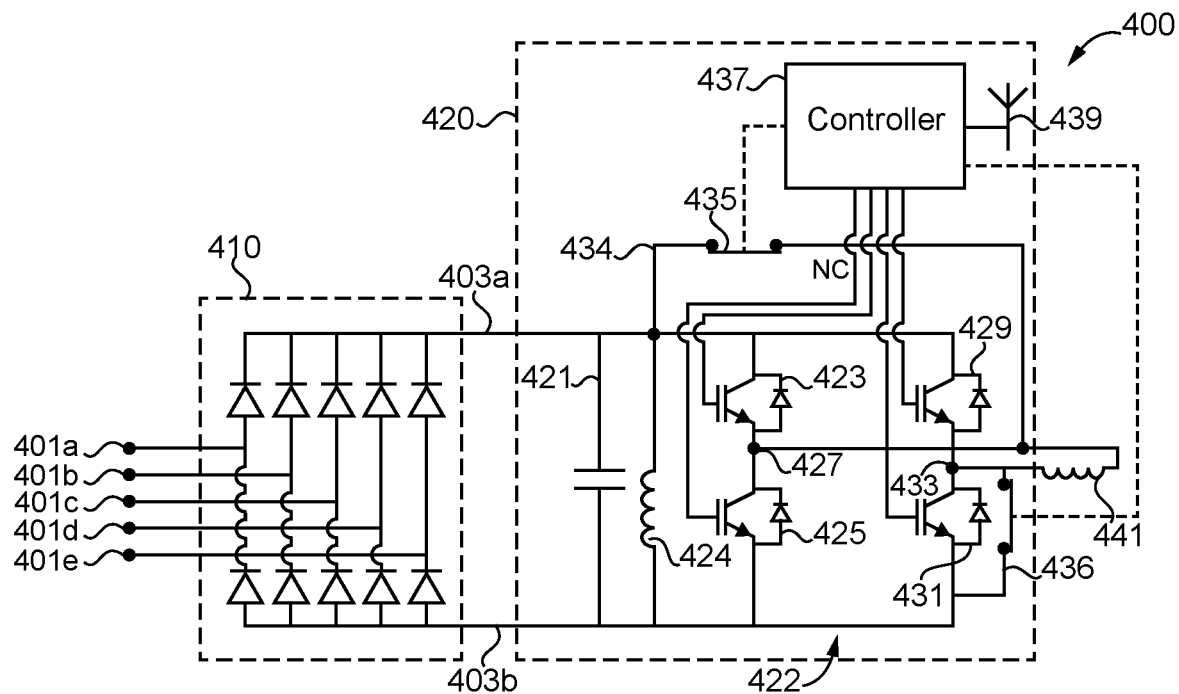
FIG. 4 is a circuit diagram illustrating an exemplary rotor direct current (DC) power supply.

With reference to FIG. 4 there is illustrated an exemplary DC power supply 400, such as DC power supply 130 of synchronous generator 100 in FIG. 1 or DC power supply 330 of synchronous generator 300 in FIG. 3. In startup operation mode, power supply 400 is structured to receive air gap harmonic power generated by rotation of a rotor and a magnetic field, such as the magnetic field generated by the magnetic field generation systems in FIGS. 1 and 3. The received harmonic power charges DC power supply 400 until the voltage across the DC bus rails 403a and 403b is greater than a threshold voltage to operate the synchronous generator at a synchronous speed using a main field winding 441, including transmitting sufficient power to controller 437 so as to operate the switching devices of chopping circuit 422.

DC power supply 400 includes energy harvest winding terminals 401a-e, a rectifier 410, and a DC current regulator 420. Each energy harvest winding terminal 401a-e is structured to receive harmonic power from one phase of the set of energy harvest windings 127.

Rectifier 410 is structured to receive harmonic power from the energy harvest winding terminals 401a-e, convert the harmonic power to DC power, and output the converted DC power to a positive DC bus rail 403a and a negative DC bus rail 403b. In the illustrated embodiment, rectifier 410 includes a plurality of diodes arranged so as to convert the AC harmonic power to DC power. In other embodiments, rectifier 410 includes active switching devices structured to convert the AC harmonic power to DC power.

In the illustrated embodiment, DC power supply 400 includes an auxiliary field winding 424, such as auxiliary field winding 128 in FIG. 1. Auxiliary field winding 424 is structured to generate a magnetic field using power received from energy harvest winding terminals 401a-e in startup operation mode. In the illustrated embodiment, auxiliary field winding 424 is structured to generate a magnetic field in normal operation mode. Auxiliary field winding 424 is structured so as to have the same current density of main field winding 441. In order to determine the size and number of turns of the auxiliary field winding 424, the following equation set may be used, where $J_{Aux}$ is the current density of auxiliary field winding 424, $J_{FW}$ is the current density of main field winding 441, $R_{Aux}$ is the resistance of auxiliary field winding 424, L is the number of turns of auxiliary field winding 424, A is the cross section of auxiliary field winding 424, p is the resistivity of auxiliary field winding 424, and $V_{DC}$ is a nominal voltage across DC bus rails 403a and 403b:

$$J_{Aux} = J_{FW} \quad (1)$$
$$R_{Aux} = \rho \frac{L}{A}$$
$$J_{Aux} = \frac{V_{DC}}{(A \cdot R_{Aux})}$$

In certain embodiments, auxiliary field winding 424 is coupled in series with a switching device controlled by controller 437. For example, the switching device coupled to auxiliary field winding 424 may be a normally closed relay and structured to remain closed while DC power supply 400 is in startup operation and open while DC power supply 400 is in normal operation mode. In certain embodiments, auxiliary field winding 424 does not have the same current density as field winding 441. In certain embodiments, DC power supply 400 does not include auxiliary field winding 424.

DC current regulator 420 is structured to receive the DC power from rectifier 410, step up or step down the voltage of the DC power, and output the modified DC power to a main field winding 441. DC current regulator 420 includes a capacitor coupled across DC bus rail 403a and DC bus rail 403b. DC current regulator 420 may also include a varistor coupled across DC bus rail 403a and DC bus rail 403b.

DC current regulator 420 includes a DC chopping circuit 422 coupled across DC bus rail 403a and DC bus rail 403b. DC chopping circuit 422 includes two legs, the first leg including semiconductor device 423 and semiconductor device 425 coupled in series at a midpoint connection 427. The second leg includes semiconductor device 429 and semiconductor device 431 coupled in series at a midpoint connection 433. Main field winding 441 is coupled to midpoint connection 427 and midpoint connection 433. It shall be appreciated that the topology of DC chopping circuit 422 is illustrated for the purpose of explanation and is not intended as a limitation of the present disclosure. In other embodiments, DC chopping circuit 422 may be replaced by other topologies, such as single semiconductor device boost converters or single semiconductor device buck converters, to name but a few examples.

The semiconductor devices of chopping circuit 422 may include insulated gate bipolar transistors (IGBTs), bipolar junction transistors (BJTs), metal oxide semiconductor field effect transistors (MOSFETs), gate turn-off thyristors (GTOs), MOS-controlled thyristors (MCTs), integrated gate-commutated thyristors (IGCTs), silicon carbide (SiC) switching devices, gallium nitride (GaN) switching devices, or any other type of switch structured to selectively control the flow of electric current. The semiconductor devices of chopping circuit 422 may also include freewheeling diode electrically coupled in an anti-parallel formation with a switch. It shall be appreciated that the features of the semiconductor devices of chopping circuit 422 may be present in other semiconductor devices described herein.

DC current regulator includes a controller 437 structured to receive commands with a transceiver 439 by way of a wireless communication protocol. Controller 437 is structured to operate the semiconductor devices of chopping circuit 122 so as to receive the DC power from rectifier 410, step up or step down the voltage of the received DC power, and output the modified DC power to main field winding 441.

DC current regulator 420 also includes a bypass current path 434 including switching device 435 and switching device 436. In the illustrated embodiment, switching devices 435 and 436 are normally closed relays controlled by controller 437. Once voltage across DC bus rails 403a and 403b increases to a level sufficient to power the electronics and control circuitry of controller 437, switching devices 435 and 426 are opened and voltage across DC bus rails 403a and 403b continues to increase to a threshold voltage sufficient for synchronous operation of generator 300. It shall be appreciated that any or all of the foregoing features of DC power supply 400 may also be present in the other DC power supplies disclosed herein, such as DC power supply 500 in FIG. 5. DC chopper circuit 422 may include additional components added for protection and other transient operation.

Figure 5:
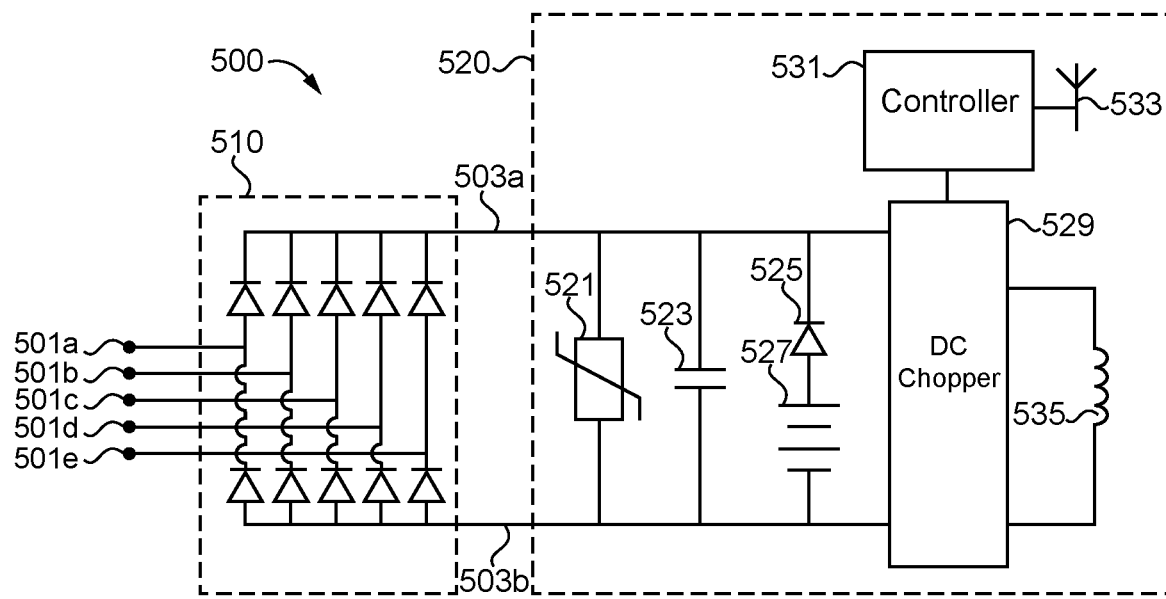
FIG. 5 is a circuit diagram illustrating another exemplary rotor DC power supply.

With reference to FIG. 5 there is illustrated an exemplary DC power supply 500 structured to provide power to a field winding during startup operation mode using a DC power source incorporated into a rotor of a synchronous machine, such as synchronous generator 100 of FIG. 1 or synchronous generator 300 of FIG. 3. Unlike synchronous generator 100, a synchronous generator including power supply 500 does not require startup DC power supply 150, and unlike synchronous generator 300, a synchronous generator including DC power supply 500 does not require the plurality of permanent magnets 135.

DC power supply 500 is coupled to energy harvest winding terminals 501a-e and structured to receive AC air gap harmonic power from a set of energy harvest windings. DC power supply 500 includes a rectifier 510 and a DC current regulator 520. Rectifier 510 is structured to receive AC harmonic power from terminals 501a-e, convert the received AC power to DC power, and output the converted DC power to positive DC bus rail 503a and negative DC bus rail 503b.

DC current regulator 520 includes a DC chopper circuit 529 coupled across DC bus rails 503a and 503b. DC chopper circuit 529 is coupled to a controller 531 and structured to receive switching commands using a wireless communication protocol and a transceiver 533. Controller 531 outputs activation signals to DC chopper circuit 529 effective to operate the DC chopper circuit 529 so as to receive DC power from rectifier 510, step up or step down the voltage of the DC power, and output the modified DC power to a field winding 535.

DC current regulator 520 includes a varistor 521 and a capacitor 523, each coupled across DC bus rail 503a and DC bus rail 503b. DC current regulator 520 includes a DC power source 527 coupled in series with a diode 525 across DC bus rail 503a and 503b. In the illustrated embodiment, power source 527 is a battery. In certain embodiments, power source 527 may include a rechargeable battery, a battery bank, a capacitor, or a supercapacitor, to name but a few examples. DC current regulator 520 is structured to passively supply DC power from power source 527 to DC chopper circuit 529 once the voltage across the DC bus rails 503a and 503b decreases to a magnitude less than the magnitude of the voltage across power source 527. It shall be appreciated that any or all of the foregoing features of DC power supply 500 may also be present in the other DC power supplies disclosed herein.

Further written description of a number of exemplary embodiments shall now be provided. One embodiment is an exciterless synchronous generator comprising a stator including a set of stator windings; a rotor including an energy harvest winding, a DC power supply including a DC bus and coupled to the energy harvest winding, and a field winding coupled to the DC power supply; and a startup excitation system comprising one of: a magnetic field generation system structured to generate a magnetic field received by the energy harvest winding in response to a rotation of the rotor, wherein the magnetic field is converted to DC power with the DC power supply and transmitted to the field winding; or a rotor DC power source including and diode coupled in series across the DC bus.

In certain forms of the foregoing exciterless synchronous generator, the magnetic field generation system includes a stator startup DC power supply coupled across the set of stator windings and including a switching device structured to controllably provide DC power from a stator DC power source to the set of stator windings while the rotor is rotating. In certain forms, the set of stator windings includes a first stator winding coupled in series with a second stator winding and a third stator winding is coupled in parallel with the second stator winding. In certain forms, the magnetic field generation system includes a plurality of permanent magnets operatively coupled to the rotor or to the stator. In certain forms, the rotor comprises a plurality of rotor poles and each of the plurality of permanent magnets are operatively coupled to a rotor pole of the plurality of rotor poles.

In certain forms, the DC power supply includes a rectifier including a diode, and wherein each permanent magnet of the plurality of permanent magnets is sized such that the power received with the energy harvest winding includes a voltage magnitude greater than a forward bias voltage of the diode. In certain forms, the rotor comprises a plurality of energy harvest windings coupled to the DC power supply. In certain forms, the magnetic field generation system includes a stator startup AC power supply coupled across the set of stator windings and structured to controllably provide AC power to the set of stator windings while the rotor is rotating.

Another exemplary embodiment is an exciterless synchronous generator comprising a stator including a set of stator windings; a rotor including an energy harvest winding, a DC power supply including a DC bus and coupled to the energy harvest winding, and a field winding coupled to the DC power supply; and a startup excitation system comprising one of: a passive startup system incorporated into the rotor structured to provide DC power to the field winding during a startup operation; or a stator startup DC power supply coupled across the set of stator windings and including a switching device structured to controllably provide DC power from a stator DC power source to the set of stator windings while the rotor is rotating during startup operation effective to generate a magnetic field received by the energy harvest winding in response to the rotation of the rotor.

In certain forms of the foregoing exciterless synchronous generator, the passive startup system includes a rotor DC power source and a diode coupled in series across the DC bus and structured to provide DC power to the field winding in response to a DC bus voltage generated by power received from the energy harvest winding decreasing below a voltage across the rotor DC power source. In certain forms, the rotor DC power source comprises at least one of a battery, a battery bank, a rechargeable battery, a capacitor, and a supercapacitor. In certain forms, the set of stator windings includes a first stator winding coupled in series with a second stator winding and a third stator winding is coupled in parallel with the second stator winding. In certain forms, the passive startup system comprises a plurality of permanent magnets operatively coupled to an outer surface of the rotor. In certain forms, the rotor comprises a plurality of rotor poles and each of the plurality of permanent magnets is operatively coupled to one rotor pole of the plurality of rotor poles. In certain forms, the DC power supply includes a rectifier including a diode, and wherein each of the plurality of permanent magnets is sized such that the power received with the energy harvest winding includes a voltage magnitude greater than a forward bias voltage of the diode. In certain forms, the stator startup DC power supply includes a diode or a current limiting device coupled in series with the stator DC power source.

A further exemplary embodiment is a method comprising operating an exciterless synchronous generator comprising a stator including a set of stator windings, a rotor including: an energy harvest winding, a DC power supply including a DC bus and coupled to the energy harvest winding, and a field winding coupled to the DC power supply, a startup excitation system comprising one of: a magnetic field generation system structured to generate a magnetic field received by the energy harvest winding in response to a rotation of the rotor, wherein the magnetic field is converted to DC power with the DC power supply and transmitted to the field winding, or a rotor DC power source including and diode coupled in series across the DC bus; increasing a voltage across the DC bus during a startup operation mode using the startup excitation system; and operating the exciterless synchronous generator in a normal operation mode in response to the voltage across the DC bus exceeding a threshold voltage sufficient to operate the exciterless synchronous generator at a synchronous speed.

In certain forms of the foregoing method, the magnetic field generation system includes a stator startup DC power supply coupled across the set of stator windings and a switching device structured to controllably provide DC power from a stator DC power source to the set of stator windings while the rotor is rotating. In certain forms, the set of stator windings includes a first stator winding coupled in series with a parallel coupled second and third stator winding. In certain forms, the magnetic field generation system includes a plurality of permanent magnets operatively coupled to the rotor or to the stator. In certain forms, the rotor comprises a plurality of rotor poles and each permanent magnet of the plurality of permanent magnets are operatively coupled to one rotor pole of the plurality of rotor poles, wherein the DC power supply includes a rectifier including a diode, and wherein each permanent magnet of the plurality of permanent magnets are sized such that the power received with the energy harvest winding includes a voltage greater than a forward bias voltage of the diode. In certain forms, the magnetic field generation system includes a stator startup AC power supply coupled across the set of stator windings and structured to controllably provide AC power to the set of stator windings while the rotor is rotating.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. An exciterless synchronous generator comprising:
a stator including a set of stator windings;
a rotor including:
an energy harvest winding,
a DC power supply coupled to the energy harvest winding and including rectifier and a DC bus, the rectifier including a diode, and
a field winding coupled to the DC power supply; and
a startup excitation system including a magnetic field generation system including a plurality of permanent magnets structured to generate a magnetic field received by the energy harvest winding in response to a rotation of the rotor, each permanent magnet of the plurality of permanent magnets is sized such that power received from the energy harvest winding includes a voltage magnitude greater than a forward bias voltage of the diode,
wherein the magnetic field is converted to DC power with the DC power supply and transmitted to the field winding.

2. The exciterless synchronous generator of claim 1 wherein the rotor comprises a plurality of rotor poles and each of the plurality of permanent magnets are operatively coupled to a rotor pole of the plurality of rotor poles.

3. The exciterless synchronous generator of claim 1 wherein the rotor comprises a plurality of energy harvest windings coupled to the DC power supply.

4. The exciterless synchronous generator of claim 1 wherein the plurality of permanent magnets is operatively coupled to an outer surface of the rotor.

5. The exciterless synchronous generator of claim 1 wherein a magnet length of at least one of the plurality of permanent magnets is less than a length of the rotor.

6. The exciterless synchronous generator of claim 1, wherein the rotor comprises a plurality of rotor poles and where the plurality of permanent magnets is operatively coupled to less than all rotor poles of the plurality of rotor poles.

7. An exciterless synchronous generator comprising:
a stator including a set of stator windings;
a rotor including:
an energy harvest winding,
a DC power supply coupled to the energy harvest winding and including a DC bus and a rectifier, the rectifier including a diode, and
a field winding coupled to the DC power supply; and
a startup excitation system including a passive startup system structured to provide DC power to the field winding during a startup operation, the passive startup system including a plurality of permanent magnets, each of the plurality of permanent magnets being sized such that a power received with the energy harvest winding includes a voltage magnitude greater than a forward bias voltage of the diode.

8. The exciterless synchronous generator of claim 7 wherein the plurality of permanent magnets is operatively coupled to an outer surface of the rotor.

9. The exciterless synchronous generator of claim 8 wherein the rotor comprises a plurality of rotor poles and each of the plurality of permanent magnets is operatively coupled to one rotor pole of the plurality of rotor poles.

10. The exciterless synchronous generator of claim 7 wherein the rotor comprises a plurality of energy harvest windings coupled to the DC power supply.

11. The exciterless synchronous generator of claim 7 wherein a magnet length of at least one of the plurality of permanent magnets is less than a length of the rotor.

12. The exciterless synchronous generator of claim 7 wherein the rotor comprises a plurality of rotor poles and where the plurality of permanent magnets is operatively coupled to less than all rotor poles of the plurality of rotor poles.

13. A method comprising:
operating an exciterless synchronous generator comprising:
a stator including a set of stator windings,
a rotor including:
an energy harvest winding,
a DC power supply coupled to the energy harvest winding and including a DC bus and a rectifier, the rectifier including a diode, and
a field winding coupled to the DC power supply,
a startup excitation system including a magnetic field generation system including a plurality of permanent magnets structured to generate a magnetic field received by the energy harvest winding in response to a rotation of the rotor, wherein each permanent magnet of the plurality of permanent magnets is sized such that power received from the energy harvest winding includes a voltage greater than a forward bias voltage of the diode, and wherein the magnetic field is converted to DC power with the DC power supply and transmitted to the field winding,
increasing a voltage across the DC bus during a startup operation mode using the startup excitation system; and
operating the exciterless synchronous generator in a normal operation mode in response to the voltage across the DC bus exceeding a threshold voltage sufficient to operate the exciterless synchronous generator at a synchronous speed.

14. The method of claim 13 wherein the plurality of permanent magnets operatively are coupled to the rotor or to the stator.

15. The method of claim 14 wherein the rotor comprises a plurality of rotor poles and each permanent magnet of the plurality of permanent magnets are operatively coupled to one rotor pole of the plurality of rotor poles.

16. The method of claim 13 wherein the plurality of permanent magnets is operatively coupled to an outer surface of the rotor.

17. The method of claim 13 wherein the rotor comprises a plurality of energy harvest windings coupled to the DC power supply.

18. The method of claim 13 wherein a magnet length of at least one of the plurality of permanent magnets is less than a length of the rotor.

19. The method of claim 13 wherein the rotor comprises a plurality of rotor poles and where the plurality of permanent magnets is operatively coupled to less than all rotor poles of the plurality of rotor poles.

* * * * *